(12) United States Patent
Ross et al.

(10) Patent No.: US 6,263,212 B1
(45) Date of Patent: Jul. 17, 2001

(54) SHORT MESSAGE SERVICE CENTER

(75) Inventors: Frederick L. Ross; Edward J. Stashluk, Jr., both of Austin, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/024,360

(22) Filed: Feb. 17, 1998

(51) Int. Cl.⁷ ........................................ H04Q 7/20
(52) U.S. Cl. .............................. 455/466; 370/428
(58) Field of Search ............................ 455/466, 414, 455/422, 432, 433, 435, 445, 560, 412, 453; 395/200.33; 370/259, 312, 410, 522, 349, 428, 466; 399/200.36; 709/103, 105

(56) References Cited

U.S. PATENT DOCUMENTS

| | | | |
|---|---|---|---|
| 5,208,665 | * 5/1993 | McCalley et al. | 725/119 |
| 5,351,235 | * 9/1994 | Lahtinen | 455/560 |
| 5,577,102 | 11/1996 | Koivunen | 379/59 |
| 5,692,193 | 11/1997 | Jagannathan et al. . | |
| 5,734,979 | * 3/1998 | Lu et al. | 455/428 |
| 5,768,509 | * 6/1998 | Gunluk | 395/200 |
| 5,787,357 | * 7/1998 | Salin | 455/466 |
| 5,822,700 | * 10/1998 | Hult et al. | 455/466 |
| 5,878,351 | * 3/1999 | Alanara et al. | 455/466 |
| 5,903,726 | * 5/1999 | Donovan et al. | 395/200.36 |
| 5,903,832 | * 5/1999 | Seppanen et al. | 455/414 |
| 5,930,239 | * 7/1999 | Turcotte | 370/310 |
| 5,946,630 | * 8/1999 | Willars et al. | 455/466 |
| 6,058,303 | * 5/2000 | Astrom et al. | 455/413 |
| 6,078,820 | * 6/2000 | Wells et al. | 455/466 |
| 6,150,962 | * 11/2000 | Rossmann | 341/22 |
| 6,151,507 | * 11/2000 | Laiho et al. | 455/466 |

FOREIGN PATENT DOCUMENTS

| | | |
|---|---|---|
| WO 98/28920 | * 12/1996 | (WO) . |
| WO 98/34422 | * 1/1997 | (WO) . |
| WO 97 26765 | 7/1997 | (WO) . |

* cited by examiner

*Primary Examiner*—Nay Maung
*Assistant Examiner*—Jean A Gelin
(74) *Attorney, Agent, or Firm*—Jackson Walker, LLP (57) ABSTRACT

A short message service center allowing processing characteristics to be modified for service users within a given type so that the storage and delivery of short messages to one service user of a given type may be different for another service user within the same given type is provided. The short message service center alleviates some of the potential "jams" associated with the processing of large distribution lists and closed user groups. The short message service center further allows for distributed administration. Additionally, the short message service center receives a short message in one standard format and delivers the short message in another standard format. The short message service center also utilizes both a table routing method and a global title translation method for routing messages to a recipient. The short message service center also allows a complete transmission of short messages between service entities having differing short message length definitions. The short message service center also allows for dynamic system re-configuration.

36 Claims, 8 Drawing Sheets

SHORT MESSAGE TABLE sm_id
source_address
source_ton
source_npl
source_protocol
dest_address
dest_ton
dest_npl
dest_protocol
parent_message_id
sm_text
user_bearer_flag
teleservice_id
priority
delivery_time
smdpp_max_retries
smdpp_deliveries_attempted
smdpp_redelivery_timeout
smsreq_max_retries
smsreq_deliveries_attempted
smsreq_redelivery_timeout
receipt_flag
expiry_time
status
status_cause_id
status_time
escalation_plan_number
mkt_seg_id
foreign_msg_id
local_time_stamp
msg_type
privacy_indicator
charge_indicator
validity_indicator
display_time
client_name
operator_password
equip_serial_number
short_message_length

SHORT MESSAGE SERVICE CENTER

FIELD OF THE INVENTION

The present invention relates to a short message service center that receives, stores and forwards short messages in a wireless telecommunications network.

BACKGROUND INFORMATION

A short message service center ("SMSC") receives, stores and forwards short messages in a wireless telecommunications network. The short messages are originated and received by service users connected via the telecommunications network. Some examples of service users include mobile phones, pagers, location registers, terminal operators, personal computers and other short message service centers. Using a short message service center, a telecommunications network provider is able to provide valuable teleservices such as, for example, alphanumeric paging, informational messaging (e.g., providing users with stock quotes or sports scores), and program messaging (e.g., activating or re-programming a mobile station (e.g., phone or pager) remotely). However, as wireless telecommunications networks become more widespread and more integrated, conventional SMSCs will become a significant bottleneck.

Using conventional SMSCs in the integration of the different telecommunications networks presents a problem because they are not capable of differentiating between users within a specific type of service. Conventional SMSCs may differentiate between different types of service users (i.e., a mobile phone may be treated differently from a location register), but all service users within a specific type are treated the same. This may present a problem if, for example, two regionally disparate networks having widely disparate network delivery capacities are integrated. Using conventional SMSCs, the network provider would have to decide which network's capacity to use as a limiting factor in setting up the delivery characteristics of the SMSC. If the lower capacity network is chosen as the limiting factor, the higher capacity network is underutilized. If the higher capacity network is chosen as the limitation, the lower capacity network will be overloaded. Of course, one option would be to provide a separate SMSC for each network that is tailored to the capacity of that network, instead of a single SMSC. However, this would obviously impose additional startup, administrative, and maintenance costs.

Individual network delivery capacities also become an important factor during the processing of distribution lists. Distribution lists allow a service user to easily send a short message to a large number of users by setting up a distribution list specifying which service users will receive the short message the first time the user sends out a short message to those service users. Then, for future messages, the user merely needs to specify the distribution list as the recipient and the system will send the message to every service user included in the distribution list. A problem occurs if the distribution list contains a large number of recipients. The delivery capacity of a specific telecommunications network may not be sufficient to expeditiously send out all of the messages, thereby creating a bottleneck which may cause processing in the SMSC to grind to a halt until the delivery to the distribution list is complete. Conventional SMSCs take different approaches to solving this problem. In a first approach, nothing is done to avoid the problem, and the SMSC is allowed to effectively stall and is thus prevented from performing other tasks. In a second approach, service users are restricted from creating distribution lists beyond a predetermined size. This may force the user to create several lists when only a single large distribution list would suffice, which minimizes the benefits of having distribution lists in the first place. Thus, neither of these approaches provides a means of optimally processing distribution lists while allowing service users to realize the full benefits of distribution lists.

Another problem associated with integration is incompatibility of the short messages being transmitted in the various wireless telecommunications networks. Currently, the two major standard protocol definitions for short messages are ANSI 41 (variants of which are Time Domain Multiple Access ("TDMA") and Code Division Multiple Access ("CDMA")) and Global System for Mobile Telecommunications ("GSM") 03.40 specification (promulgated by the European Telecommunications Standards Institute ("ETSI")). These two protocols have different formats for short messages, and conventional SMSCs are incapable of delivering short messages from a service user on a network using ANSI 41 to a service user on a network using GSM, and vice versa. Thus, service users using one protocol are limited to recipients using the same protocol.

Integration using conventional SMSCs presents still another problem due to the different addressing systems used by the various telecommunications networks to identify their service users. For example, every service user must have a unique identification. In the wireless telecommunications field, this unique identification is called a Mobile Identification Number ("MIN ID"). When a first service user sends a short message to a second service user, the short message must contain the recipient's MIN ID to inform the SMSC of the identity of the recipient. Older networks use a commonly known method of addressing called Table Routing. Using Table Routing, when the SMSC needs to communicate with a specific service user, the SMSC looks up in a table to see which home location register ("HLR") is associated with the specific MIN ID. For each HLR, the lookup table contains a corresponding address, which is made up of a point code and a subsystem number defining the HLR. A problem with the Table Routing method is that as HLRs get taken out of service and/or replaced, the lookup tables of any SMSC that needed to contact that HLR had to be individually changed. In response, a newer, method of addressing called Global Table Translation ("GTT") has been adopted by many networks. In this system, a message can be routed using just the MIN ID and the subsystem number which does not change even if HLRs are moved, replaced or taken out of service. As these two types of networks are integrated, the SMSC must be able to handle both types of addressing. However, conventional SMSCs only provide support for a single type. Thus, the integration of two networks having dissimilar addressing schemes would require separate SMSCs which as discussed above, would impose additional startup, administrative, and maintenance costs.

A further problem associated with integration is that different telecommunications networks have different definitions of a "short" message. The term short message connotes that the length of the message being sent over the network must be short. However, there is no industry-wide standard for the length of the short message, which has lead to various lengths for defining a short message throughout the industry. This may cause a problem when sending messages between networks with differing lengths for a short message. Specifically, a significant problem occurs when sending a short message from a first system having a message length that is larger than the message length for a second system receiving the message. Conventional SMSCs solve this problem using two approaches. In the first approach, the SMSC merely sends the short message without any processing leading to a garbled or incomplete message when the message is truncated by the second system. In the second approach, the service center does not deliver the message to the second system and provides an error code to the first system indicating that the message length is too long. Therefore, conventional SMSCs do not provide a means of sending a completely intact short message between systems having different definitions of a short message.

SUMMARY OF THE INVENTION

In accordance with an exemplary embodiment of the present invention, an SMSC is provided which assigns a market segment identification ("ID") to its service users allowing differentiation within each class of service users. Using this identification system, an SMSC administrator may set different delivery characteristics such as, for example, message delivery and retry policies, and delivery prioritization within a single class of service users. For the integration of networks with disparate capacities scenario discussed above, the SMSC administrator could assign the subscribers to each network a different market segment ID, and set the delivery characteristics for each market segment ID according to the appropriate capacity of the telecommunications network associated with the market segment ID. In addition, the SMSC administrator may, for example, further organize service users within a given class by usage profiles and adjust the short message delivery characteristics according to the usage profile. Furthermore, market segment identifications may also be used to prioritize teleservices so that the processing of a specific teleservice takes precedence over others.

In the SMSC of the exemplary embodiment, the entries in a distribution list of a predetermined maximum size are separated into a plurality of subsets containing a predetermined number of entries. The SMSC then attempts to deliver the plurality of subsets one at a time sequentially, and waits after each attempted delivery until a predetermined criteria for measuring the success of the previously attempted delivery was satisfied before sending the next subset. Also, the SMSC may be implemented on, for example, a multi-processing workstation running multiple message servicing processes. To alleviate possible bottlenecks within the SMSC itself as the large distribution list is processed, the SMSC may distribute the delivery processing of the subsets across the multiple processes based upon the operating characteristics of each process.

The SMSC of the exemplary embodiment also receives short messages having, for example, either an ANSI 41 or a GSM definition, and stores the messages in a canonical message format. In order to deliver the short message, the SMSC determines which definition is used by the recipient and converts the short message into the appropriate format before sending the message.

In accordance with another feature of the exemplary embodiment of the present invention, the SMSC is provided which utilizes both Table Routing and GTT to route a short message.

The SMSC of the exemplary embodiment also dynamically segments a short message into message segments having a predetermined length if the recipient is connected via a telecommunications network having a shorter message size than the sender. Initially, the SMSC administrator may indicate a maximum message length for each network entity connected to the SMSC. The SMSC may then use this maximum message length to segment short message going to those networks with a shorter message length than the standard 256 byte length on the SMSC, and send the segments separately.

In accordance with an additional feature of the exemplary embodiment, the SMSC allows for dynamic configuration of its operating characteristics including the delivery characteristics, and the various predetermined criteria discussed above to allow fQr real-time adjustments to changes in the telecommunications networks which are connected to the SMSC and changes to the SMSC itself.

The SMSC of the exemplary embodiment may be provided on a computer workstation having a processing unit, display system, and storage devices. The SMSC services may be implemented using, for example, a service logic execution environment ("SLEE") which allows for modular design of the SMSC. The SLEE may have a graphical user interface so that the services may be designed and modified using the graphical interface by using separate modules which may be designed and reused by different SMSC services. This facilitates the implementation of the SMSC and future additions and modifications to the SMSC design.

DETAILED DESCRIPTION

Figure 1:
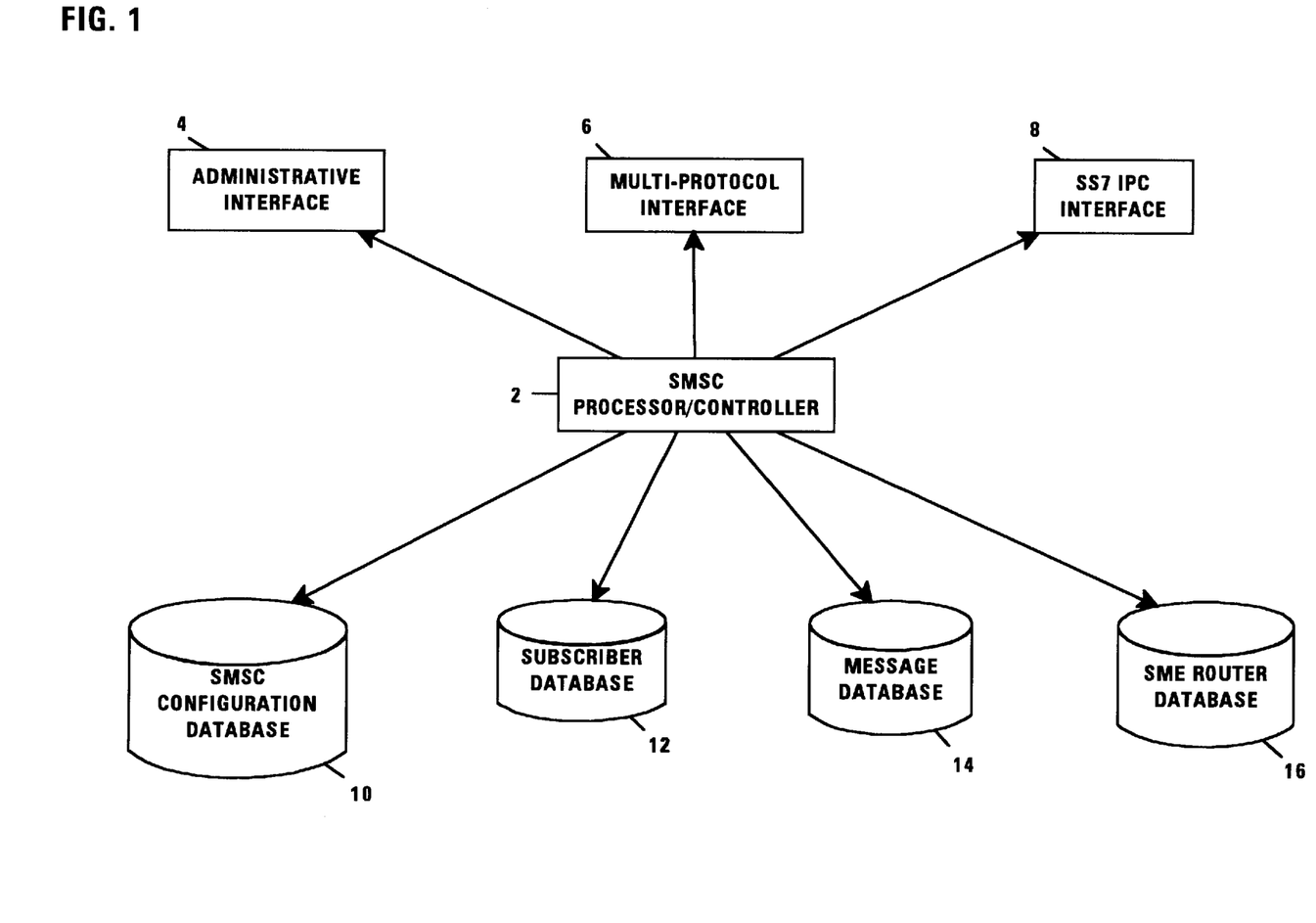
FIG. 1 illustrates an overall system architecture of an exemplary embodiment of an SMSC according to the present invention.

Overall Architecture Of An SMSC: An overall system architecture of an exemplary embodiment of an SMSC according to the present invention is shown in FIG. 1. In accordance with the present invention, an SMSC processor/controller 2 is provided having a plurality of interfaces to communicate with various entities including, for example, a system administrator and operators on terminals. Some interfaces that may be provided are, for example, an administrative interface 4, allowing an SMSC administrator to make changes and updates to the SMSC; a multi-protocol interface 6 through which short messages may be delivered using commonly known protocols such as Short Messaging Point-to-Point Protocol ("SMPP"), Telocator Alphanumeric Protocol ("TAP"), Simple Mail Transfer Protocol ("SMTP"), and Telocator Data Protocol ("TDP")/Terminal Message Entry ("TME"); and an SS7 IPC interface providing an interface for communicating with message service centers and location registers. In an exemplary embodiment, the plurality of interfaces may include, for example, an Ethernet interface, a V.35 interface and an RS-232 serial interface.

The SMSC accesses a plurality of databases to process short messages including an SMSC configuration database 10, which stores system-wide characteristics of the SMSC such as SMSC point code and subsystem number, maximum message size, Global Title translation flag, etc.; a subscriber database 12 for storing information regarding each subscriber serviced by the SMSC; a message database 14 for storing the short messages during processing; and an SME router database 16 for maintaining information for external connections to the SMSC (i.e., user names, passwords, maximum number of users logged in, etc. In an exemplary embodiment, the SMSC may be implemented using a fault-tolerant workstation having storage devices (such as, for example, disk storage devices) storing the plurality of databases, and interface devices interfacing the workstation to the telecommunications network. The SMSC may also be connected to a local area network through which administrative functions may be performed by a local SMSC administrator.

Figure 2:
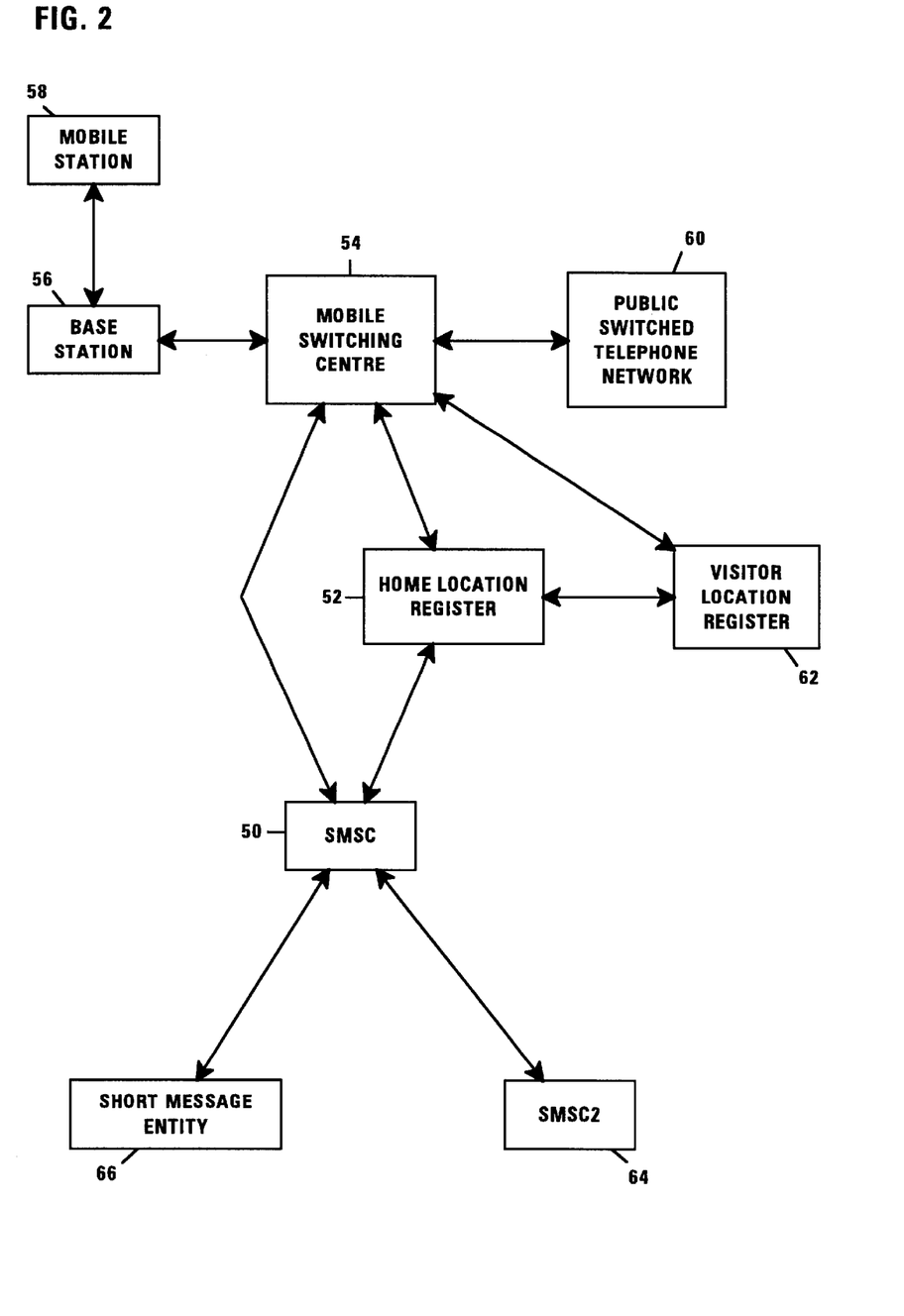
FIG. 2 illustrates an operational schematic of a wireless telecommunications network using an SMSC.

Operational Schematic Of A Telecommunications Network: FIG. 2 is a simplified operational schematic of a telecommunications network using an SMSC according to the present invention. The connections and communications between the various entities in this network are based on commonly known industry standards. The actual numbers of each entity provided in a specific deployment will vary based upon various system characteristics such as, for example, the number of users, message capacity, etc.

In accordance with the present invention, an SMSC 50 is connected to a home location register ("HLR") 52. Every service user is assigned to an HLR for purposes such as, for example, routing calls, billing, etc. This assignment to a specific HLR defines a service user's home area. The HLR 52 is also responsible for keeping track of the location of the service user on the network.

The SMSC 50 and the HLR 52 are connected to a mobile switching centre ("MSC") 54. The MSC 54 provides a connection to a base station 56 which broadcasts and receives messages from a mobile station ("MS") 58. The MSC 54 also provides an interface to a public switched telephone network ("PSTN") 60. In operation, a short message addressed to the MS 58 is received by the SMSC 50. The SMSC 50 then looks up, using either Table Routing or GTT, to determine the HLR 52 to which the MS 58 is assigned. The SMSC 50 then interrogates the HLR 52 for the MSC 54 that is servicing the MS 58. Then, the SMSC 50 routes the short message to the MSC 54, which then routes the short message to the base station 56. Finally, the base station 56 broadcasts the message, which is received by the MS 58.

One of the benefits of wireless technology is the mobility of the service user while still retaining the ability to receive messages. To accommodate the mobility of service users, a visitor location register ("VLR") 62 is also provided which keeps track of service users within its service region which is different from the HLR's 52 service region, and notifies the other entities in the network so that the service user may send and receive messages when outside of the HLR 52's service region.

The SMSC 50 is also coupled to another SMSC2 64 which may, for example, service another region, another group of service users in the same region, etc. The SMSC 50 is also coupled to a short message entity ("SME") 66. The SME 66 is an entity that composes short messages for delivery, or decomposes received short messages. SMEs are defined in ANSI 41 including, for example, computers with e-mail capabilities, operators on terminals who receive voice messages and key in a corresponding short messages, voice mail systems, interactive voice response units.

Figure 3:
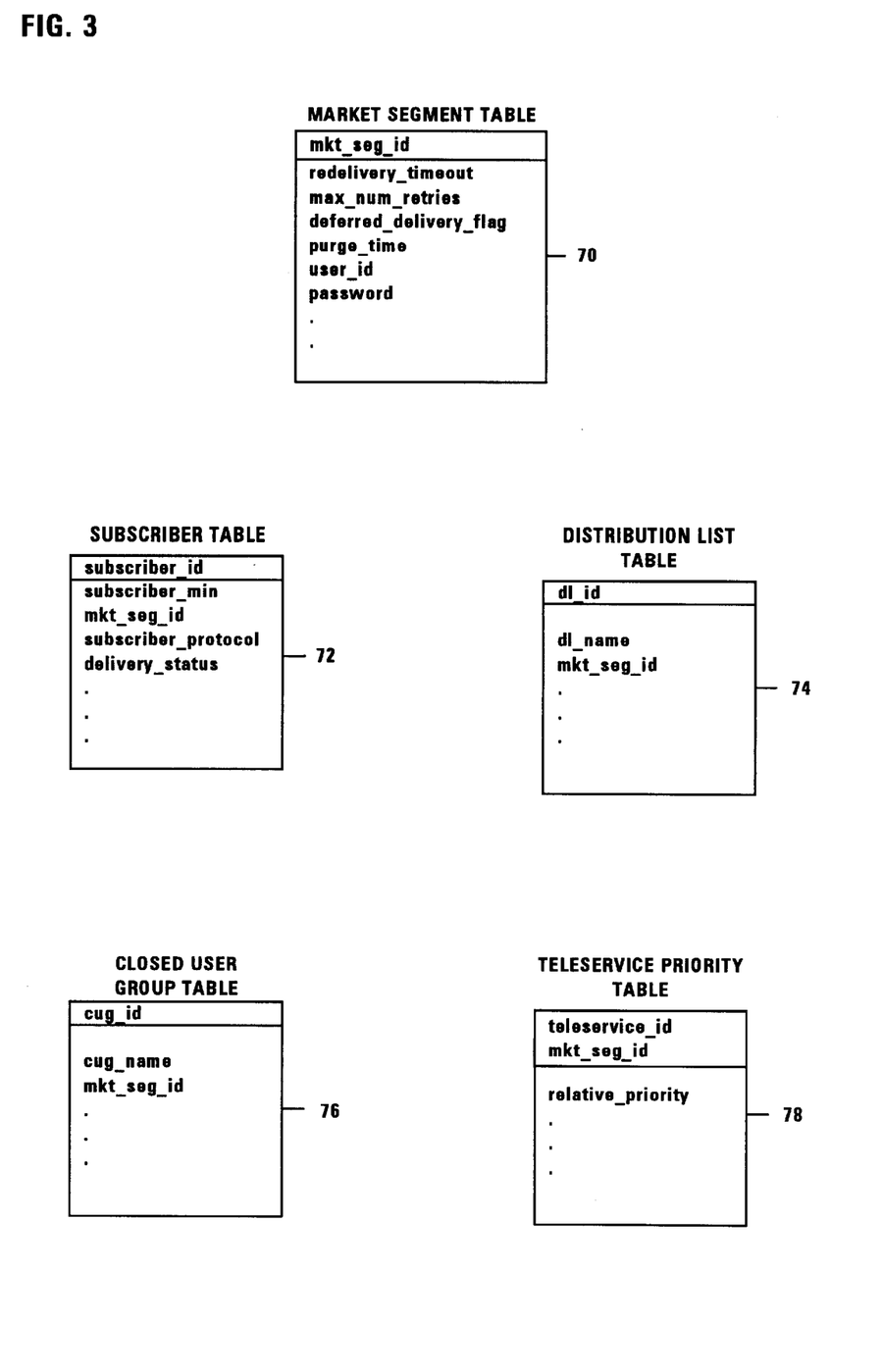
FIG. 3 illustrates a database/table schema used in an exemplary embodiment of an SMSC according to the present invention.

Database Schema: FIG. 3 illustrates an exemplary database/table schema used in an SMSC according to the present invention. The various tables shown may be stored on storage devices, and accessed by the SMSC processor/controller 2 as shown in FIG. 1. Some examples of storage devices that may be used include hard disks, tapes, and cartridges.

The exemplary database schema shown in FIG. 3 allows the SMSC 50 to differentiate between service users within a specific class for operations such as message delivery and retry. In an exemplary embodiment, market segment table 70 associates each market segment ID ("mkt_seg_id") with a predetermined set of variables that affect the storage and delivery of short messages. Variables that may be stored for a given market segment ID are, for example, 1) "redelivery_timeout," which sets the length of time for attempting redelivery before abandoning redelivery; 2) "max_num_retries," which sets the maximum number of retry attempts; 3) "deferred_delivery_flag," which sets whether to attempt a deferred delivery (i.e., delivery postponed to a later time); and 4) "purge_time," which sets how long the message should be stored on the system before being deleted.

In the subscribers table 72, a field such as a "mkt_seg_id" is included for each subscriber to associate that subscriber with a given market segment ID. This segmentation of subscribers may be done using many different grouping methods. For example, subscribers may be associated by their physical locations, usage characteristics, or the network to which they are connected. This allows an SMSC administrator, for example, to optimally set the storage and delivery characteristics based upon the subscriber's profiles, network capacity, and SMSC capacity, switch capabilities, current system load, etc. The variables stored in the market segment table 70 may then be used to affect the storage and delivery characteristics for each subscriber based upon the market segment ID for that subscriber.

A similar approach may be advantageously used in the processing of distribution lists. Distribution lists allow a service user to group a plurality of people with a single identifier, i.e., the name of the distribution list. Once the group has been created, the service user may use the name of the distribution list to send short messages to the plurality of people in the list, instead of sending a separate message to each person. Thus, in an exemplary embodiment, a distribution list table 74 may include a market segment ID field (e.g., "mkt_seg_id"), which associates a specific distribution list entry with a market segment. As with subscribers, this field could then be used to determine different storage and delivery characteristics for the various distribution lists.

Similarly, market segment IDs may also be used to segregate other processes such as, for example, closed user group processing. Closed user groups ("CUGs") are a commonly used mechanism for setting delivery restrictions for groups of service users. An administrator may group service users together into separate lists, called CUGs, and specify whether a specific CUG should be "Closed" or "Not Closed." In a "Closed" CUG, the service users may only send and receive short messages to only the other service users in the same CUG. In a "No Closed" CUG, the service users may only send messages to only the other service users in the same CUG, but may receive from anyone. Alternatively, an administrator may choose not to assign a service user to any CUG, meaning the service user may send to and receive from anyone. As telecommunications networks become more integrated, one possible problem is that several local administrators may need to control delivery restrictions of their local service users.

Thus, an exemplary embodiment of a SMSC according to the present invention includes a closed user group table 76 in which each CUG ("cug_id") may be given a market segment ID ("mkt_seg_id"). CUGs with the same market segment ID may then be assigned to a specific local administrator, and access to the CUG assignments could then be limited to the local administrator to which the CUG is assigned using, for example, passwords, user identifications, etc. Similarly, any market segment ID used in the system could similarly associated with a specific administrator, further distributing the administrative tasks associated with, for example, distribution lists, short messages, etc. This may be accomplished by including the fields ("user_id") and ("password") in the market segment table 70 to restrict access to tasks associated with the specific market segment.

Those skilled in the art will understand that the variables included in these tables are merely an exemplary set of variables that may be stored for each market segment ID, and that other variables may also be stored which affect the storage and delivery characteristics for each market segment ID without departing from the scope of the present invention.

In an exemplary embodiment, the delivery processing in the SMSC may be further affected by the teleservice type of each short message. Teleservice is a broad term defining any service that may be provided using short messages. Some commonly known teleservices are alphanumeric paging, informational messaging (e.g., providing users with text messages from other users, stock quotes or sports scores), and program messaging (allowing the provider to, for example, activate or re-program a mobile station (e.g., phone or pager). The advantage of defining a priority schema for the various teleservices can be discerned by analyzing the following simple example. Program messaging may directly change the programming of a service user's receiving unit (e.g., pager or wireless phone), and if a specific program message is received which changes the receiving characteristics of the receiving unit, it would be advantageous to send all the stored messages to the receiving unit before sending the program message. This may be accomplished by setting up a teleservice priority table 78, which defines a relative priority ("relative_priority") for each teleservice ID representing a specific teleservice. Using this exemplary embodiment, short messages may then be prioritized according to their specific teleservice type.

In an alternative embodiment, instead of storing all of the subscribers, distribution lists, and teleservices in a single corresponding table, segmentation may be performed by storing each specific group (i.e., a market segment of subscribers) in a separate database. In this embodiment, a table would then be used to store delivery characteristics for each database, and the database name, instead of a market segment ID, would be used to define the groups.

Figure 4:
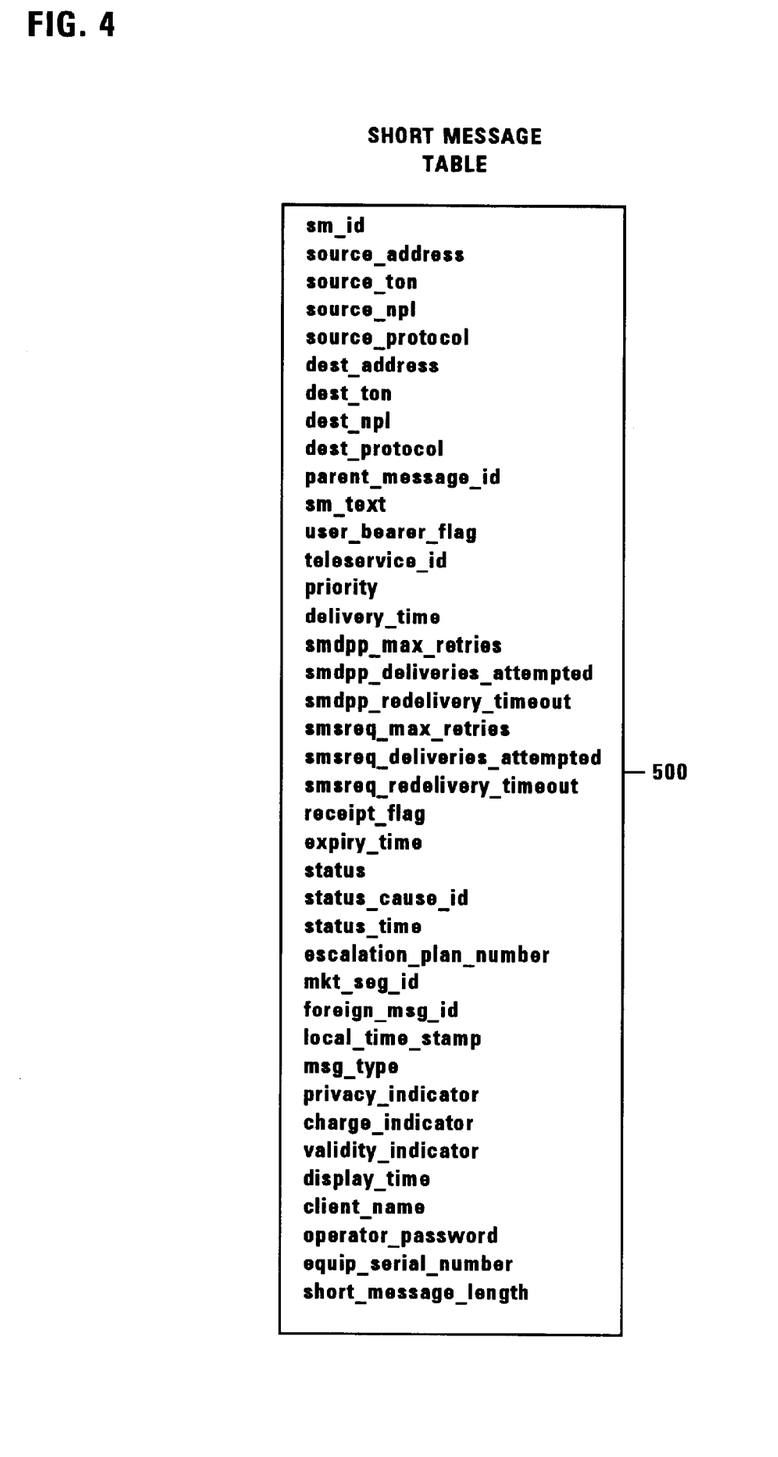
FIG. 4 illustrates an exemplary structure of a short message used in an SMSC according to the present invention.

Short Message Structure: FIG. 4 illustrates an exemplary short message structure according to the present invention. The two most commonly used formats in the telecommunications field for defining the structure of a short message are ANSI 41 (and its variants which are inconsequentially different for the purposes of the present invention) and GSM. As those skilled in the art may ascertain, the formats are not compatible so that, using conventional SMSCs, an ANSI 41 short message cannot be sent to a receiving unit operating using the GSM standard. Therefore, in conventional wireless telecommunications networks, a network is preconfigured to carry either GSM or ANSI 41 so that its service users are then similarly limited. This creates a problem when attempting to send a GSM short message to an ANSI 41 service user, or vice versa.

In accordance with the present invention, the SMSC 50 converts received short messages into a canonical format, which is illustrated in FIG. 4. As those familiar with ANSI 41 and GSM will ascertain, this canonical short message format 500 is a superset containing all of the necessary fields required by ANSI 41 and GSM. Thus, as messages are received by the SMSC 50, a new short message entry is created and the applicable fields in the canonical format are copied from the received short message. If the receiving service user requires the other standard format as determined by the SMSCs and MSCs in the network servicing the recipient, the appropriate fields of the canonically-formatted short message are then copied to an outgoing short message having just the necessary fields for the other format. Thus, an SMSC according to the present invention may receive messages in one standard format, and deliver messages in the other format. Those skilled in the art will understand that other fields may be added to the canonical format to accommodate other short message formats.

In accordance with the present invention, additional fields may be included in the canonical format to provide additional functionality. For example, a market segment ID may be assigned to each short message. In addition to restricting access to short messages among local administrators, as discussed above, market segment IDs may be used to selectively process groups of short messages based upon their market segment ID. A teleservice ID field may also be included defining the type of teleservice being provided by this short message. Thus, the delivery characteristics of a specific short message may then be determined by its market segment ID and by the teleservice type. In operation, the short message may just be assigned to the market segment ID of the recipient. Alternatively, the short message may be assigned the market segment ID of the service user who sent it is first received. Once the recipient's market segment ID is determined, the message may then be assigned the market segment ID of the recipient. This allows the storage characteristics (e.g., purge time limits) and delivery characteristics to be further differentiated.

Those skilled in the art will understand that the fields shown in FIG. 4 are merely exemplary, and that additional fields may be used to accommodate other short message formats or to provide additional short message processing capabilities without departing from the scope of the present invention.

Distribution List Processing: Although the use of distribution lists facilitates a broadcast of a short message to a large number of service users, this can create a severe "traffic jam" in the telecommunications network and the SMSC itself. More specifically, a "jam" is created on the telecommunications network by a large number of short messages flooding the network via a single send command by a service user. Depending on the capacity of a given network, this large influx of messages may cause a significant delay in the delivery of other messages and general processing through that network.

Figure 5:
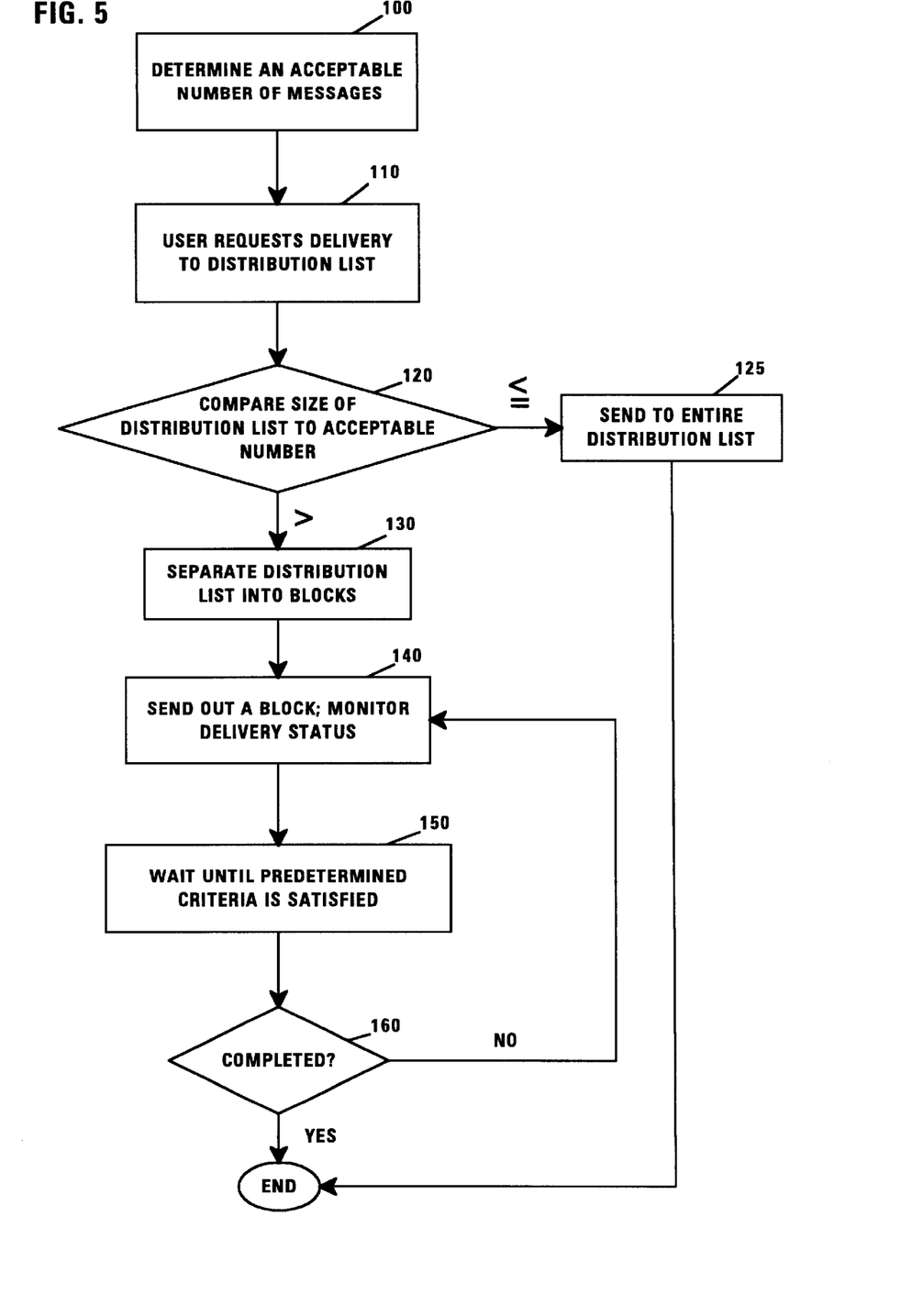
FIG. 5 illustrates an exemplary method for processing of distribution lists.

In accordance with the present invention, an exemplary method of processing of short messages to distribution lists is illustrated in FIG. 5. At step 100, an SMSC administrator determines a first predetermined maximum number of short messages that can be sent via the network without causing unacceptable delays. When a service user specifies that a short message should be delivered to a distribution list ("DL") at step 110, the SMSC compares the number of entries in the DL with the first predetermined maximum number at step 120. If the number of entries is less than the first predetermined number, all of the short messages are sent out at step 125 without any segmentation. If the number of entries is greater than the first predetermined number, then at step 130, the SMSC separates the distribution list entries into blocks of entries with a maximum size corresponding to the first predetermined number (although the last block may contain less depending on whether the actual number of entries is a multiple of the first predetermined number). At step 140, the SMSC sends out the first block, and monitors the delivery status. At step 150, the SMSC delays the delivery of the next block until the delivery status of the first block satisfies a predetermined criteria of success. For example, the SMSC may wait until a first predetermined percentage of the first block of messages have been successfully transferred. Then at step 160, the SMSC determines whether all the blocks have been sent out. If all the blocks have been sent out, no further processing of the distribution is necessary although the messages may then be marked as delivered. If all the blocks have not been sent out, then the SMSC goes back to step 140 and repeats. In accordance with the present invention, the SMSC administrator may adjust the first predetermined number and the predetermined criteria to optimally tune the SMSC with the rest of the telecommunications network.

In an alternative embodiment, instead of separating the entries on the distribution list into blocks of entries, the SMSC may make a separate copy of the short message for each of the entries on the distribution list. Then instead of processing blocks of entries, the SMSC may process blocks of short messages corresponding to the blocks of entries in the previous embodiment.

Figure 6:
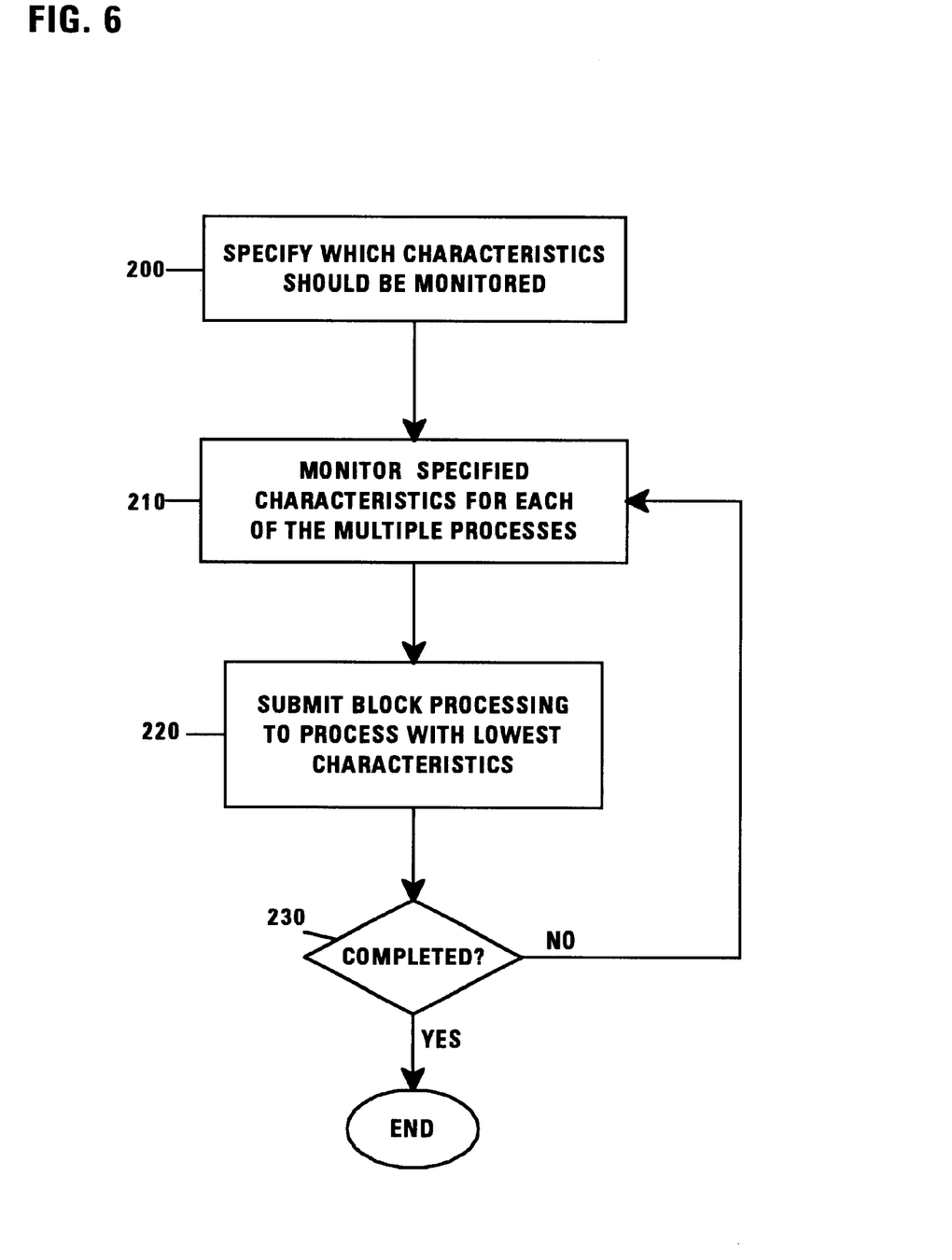
FIG. 6 illustrates an exemplary method for load balanced processing of distribution lists across multiple processes.

In addition, a potential "jam" internal to the SMSC is avoided by load balancing the multiple processes that are processing the short messages. In accordance with the present invention, the SMSC will be implemented on a computer workstation capable of running multiple parallel processes handling the processing of short messages. This type of computer workstation is commonly known and used throughout the telecommunications field. An exemplary workstation would be a Sun Microsystems Fault Tolerant SPARC Server running Solaris 2.5.x, although other types of workstations are similarly capable of being used according to the present invention. In order to ensure that a single process is not overwhelmed and "jammed" by the large processing requirements associated with the delivery to a large distribution list, each short message entry in a given block of the distribution list is submitted to a specific process according to the specific characteristics of that process. In an exemplary embodiment illustrated in FIG. 6, an SMSC administrator may specify which characteristics of each process should be monitored along with a corresponding weighting factor for each characteristic at step 200. Examples of characteristics that may be used include the queue size (how many messages are waiting to be processed), latency (length of time it takes to receive and begin processing a message), and the growth rate (the rate of growth of the queue for this process) for each one of the parallel processes. Before submitting the message or on an ongoing basis, the SMSC may monitor these characteristics for each process and determine a weighted value for each process at step 210. The SMSC may then submit a given block to the process having the lowest weighted value at step 220, thereby ensuring that the processing load is distributed as evenly as possible. At step 230, the SMSC may determine whether processing is completed for the distribution list. If processing is not completed, the SMSC may go back to step 210. Otherwise, the processing of the distribution list would end although the messages may then be marked delivered.

Message Segmentation: In accordance with the present invention, the delivery of short messages should take into account the capacity of the switching stations carrying the short message. In conventional telecommunications networks, the most common limiting factor is the message length capabilities of the MSC 54 shown in FIG. 2.

Messages are transferred from points on a wireless telecommunications network using standard protocols. ANSI IS-41-C is a commonly used industry standard for communicating between one point on a wireless telecommunications network to another point. An SMSDeliveryPointToPoint ("SMDPP") message is part of the ANSI IS-41-C standard, and used to transfer short messages from one point to another point, and also report on the success or failure of that transfer.

Figure 7:
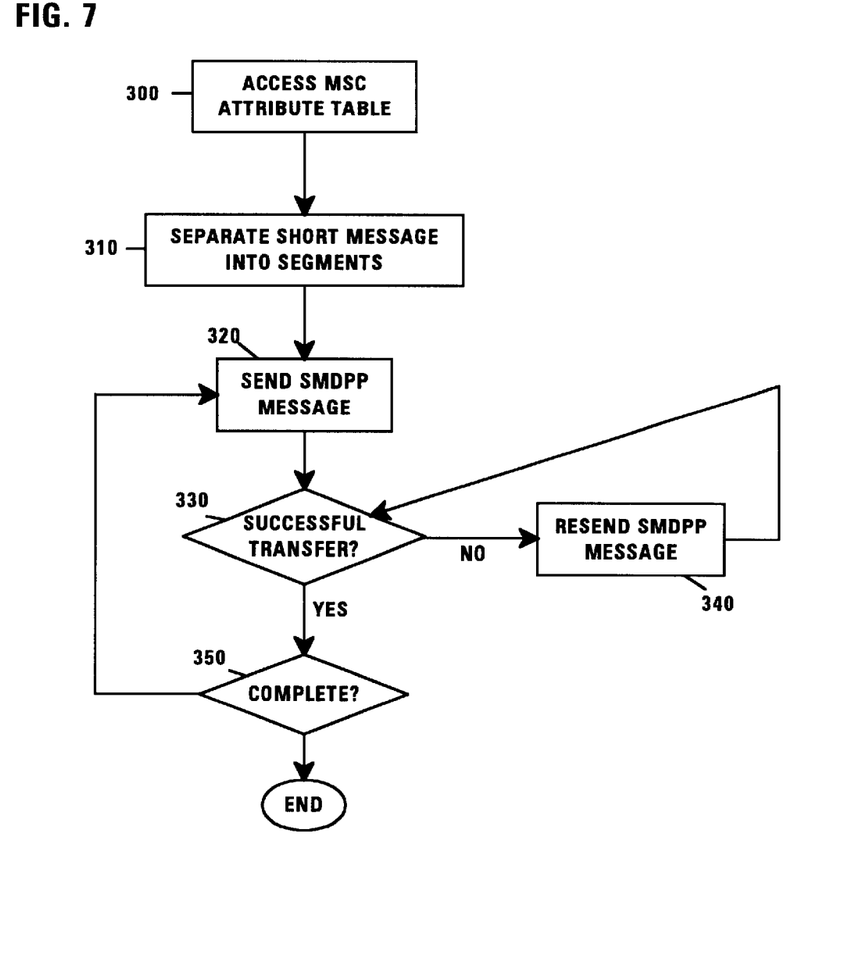
FIG. 7 illustrates an exemplary method for segmenting short messages in accordance with varying message length capacities of message service centers.

In an exemplary embodiment of an SMSC according to the present invention, the SMSC may employ an internal short message length of 256 bytes. If the MSC has the same or larger message length, the message may be sent without any additional processing. However, in order to compensate for the shorter capacities of MSCs, the SMSC may segment short messages into smaller segments corresponding to the specific capacity of the receiving unit's MSC. In an exemplary operation, illustrated in FIG. 7, an SMSC may access an MSC Attribute Table which may contain the MSC's address and the maximum message size for the MSC at step 300. A short message intended for an MSC with a shorter maximum message size may then be segmented into smaller segments at step 310, and a first SMDPP messages would be with the first segment at step 320. Before sending a subsequent SMDPP message, the SMSC may wait until it receives an indications of the success of the transfer at step 330. If a specific transfer determined to be unsuccessful, the SMSC may resend the last SMDPP request. At step 350, the SMSC may determine if all segments have been sent. If all segments have not been sent, then the SMSC may go back to step 320 and repeated until all segments have been sent. After successfully transferring all of the necessary subsegments, the SMSC may mark the short message as delivered.

Figure 8:
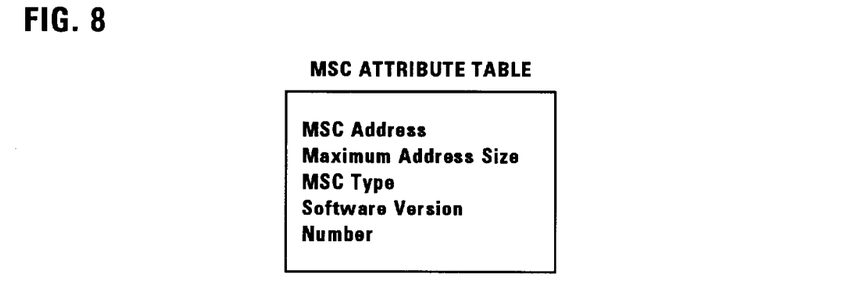
FIG. 8 illustrates an exemplary attribute table defining characteristics of message service centers.

As shown in FIG. 8, the Attribute Table may also further contain the MSC type (e.g., Lucent, Ericsson, Nortel, etc.) and the software revision number of the MSC which may aid in troubleshooting and tailoring the SMSC's delivery parameters to the specific software revision of the specific MSC. These attributes are provided merely for exemplary purposes and not as an exhaustive list, so that other attributes may be stored without departing from the scope of the present invention.

Dynamic Update Of System Delivery Parameters: In accordance with the present invention, an SMSC is provided which allows for dynamic update of system delivery parameters on a per message basis. As discussed above in reference to FIG. 3, an administrator employing an SMSC according to the present invention may specify delivery characteristics on a market segment basis.

Figure 9:
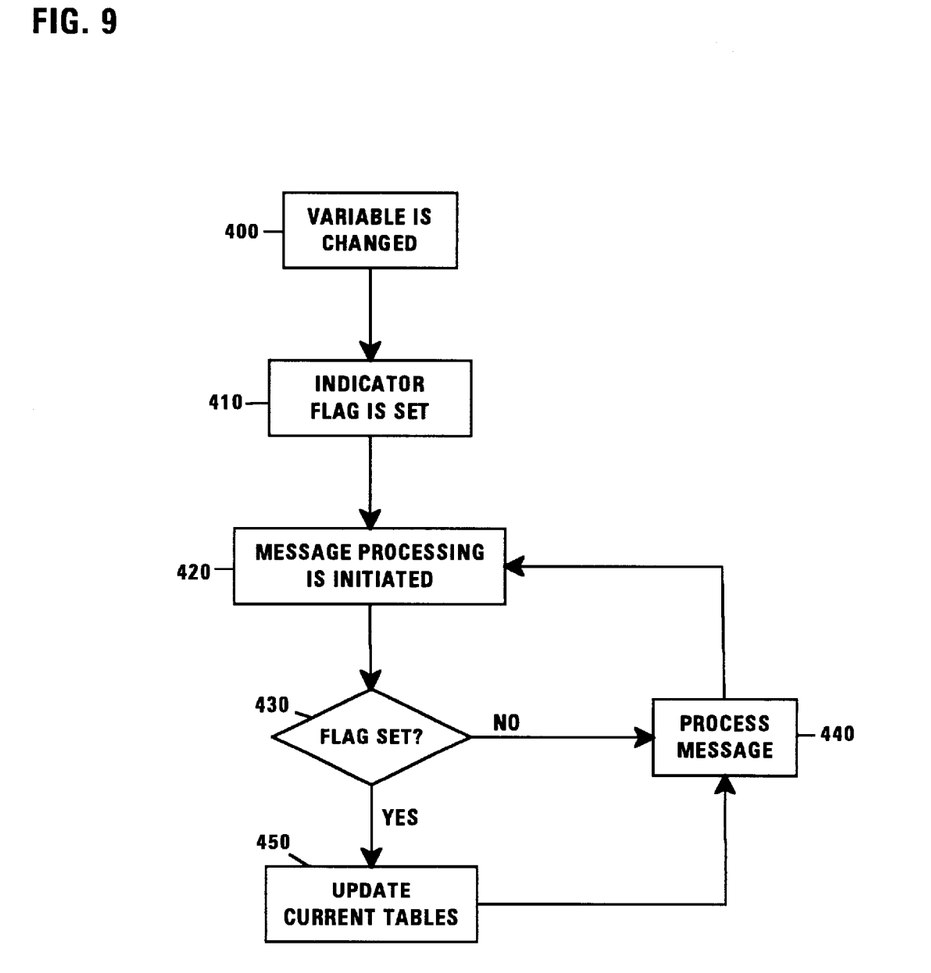
FIG. 9 illustrates an exemplary method for dynamically updating system characteristics.

In an exemplary embodiment as illustrated in FIG. 9, whenever a change is made to any of the variables that determine the specific delivery characteristics for a given market segment at step 400, an indicator flag is set to indicate that a change has been made at step 410. For example, a variable may be changed from a 0 value to a 1 value to indicate a change has been made. Problems may be created if the SMSC administrator was allowed to modify these characteristics during the processing of messages so the changes would have to be made to a temporary table. At step 420, a processing of a short message is initiated. Before the SMSC processes this short message, the SMSC preliminarily checks to see if the indicator flag indicates that a change has been made at step 430. If the flag is not set, the message is processed at step 440. If flag is set, the SMSC updates the current tables with the values stored in the temporary table at step 450 and proceeds to step 440. After the message is processed, the SMSC loops back to step 420 when another message needs processing.

Affected tables include, for example, market segment tables, and teleservice priority tables. In addition, operating tables may be updated even if they have no association with the message to be processed (i.e., all tables are updated, not just those used by the message to be processed).

Routing Methods: FIG. 10 illustrates an exemplary method of routing short messages according to the present invention. At step 500, the SMSC administrator sets a system configuration parameter ("route_met") to either a "0" for Table Routing or a "1" for GTT to define whether the system should use the Table Routing or the GTT routing method. The next step, step 600, begins after all the necessary steps have been performed (i.e., short message has been received and prepared for delivery) and the SMSC 50 has a short message to be delivered to a recipient with a specific MIN ID. (This MIN ID would have been stored in the dest_adress field shown in FIG. 4. At step 502 for this short message). At step 600, the SMSC 50 checks route_met and if it is set to a "0", then the SMSC 50 looks up in an internal lookup table 80 (shown in FIG. 11) to find the address of the HLR servicing the recipient.

In a network using Table Routing, HLRs are responsible for keeping track of which base station is in contact with the service users associated with the HLR. The internal lookup table 80 in the SMSC 50 contains a point code and subsystem number for each HLR and a range of MIN IDs serviced by the HLR. So at step 600, the SMSC 50 finds the MIN ID range containing the recipient's MIN ID. Then at step 602, the system sends out a request to the HLR using the point code and subsystem number to deliver a message along with the message to be delivered. Those skilled in the art will understand that further handshaking may be necessary to insure proper delivery which will not be discussed to simplify the discussion.

If at step 600, route_met is determined to be 1 (or not 0), the SMSC 50 sends the MIN ID and a subsystem number (typically "6" for an HLR) along with the message to be delivered to a Signal Transfer Point ("STP") at step 610. At step 612, the STP then determines HLR that is servicing a MIN ID range containing the recipient's MIN ID and forwards the MIN ID and message to the appropriate HLR. As before, those skilled in the art will understand that further handshaking may be necessary to insure proper delivery. The STP is typically a computer or network that maintains the HLR addresses for all MIN IDs in that system. The GTT routing method avoids having to individually updating the lookup tables for all the SMSCs throughout the network by funneling all messages through the single STP which is the only system that needs to be updated.

What is claimed is:

1. A method for processing a short message by a short message service center comprising the steps of:

defining a first market segment of service users based on a segmentation criterion;

assigning a plurality of service users to the first market segment;

defining at least one storage variable and at least one delivery variable for the first market segment;

receiving from a message originator a short message for at least one of the service users assigned to the first market segment;

storing the short message as a function of the storage variable; and delivering the short message to the at least one service user a function of the delivery variable.

2. The method according to claim 1, wherein the plurality of service users includes a plurality of recipients on a distribution list.

3. The method according to claim 2, further comprising the steps of:

setting a first predetermined maximum number indicating a maximum number of recipients on the distribution list that may be processed in a single block; and determining a first number of recipients on the distribution list;

wherein if the first number of recipients exceeds the first predetermined maximum number, performing the steps of:

separating the plurality of recipients on the distribution list into a plurality of blocks of recipients, each one of the plurality of blocks of recipients being a subset of the plurality of recipients, wherein each one of the plurality of blocks of recipients contains a maximum number of recipients corresponding to the first predetermined maximum number, transmitting the short message to a first block of the plurality of blocks of recipients, monitoring a delivery status of the first block, and transmitting a second block of the plurality of blocks of recipients after the delivery status satisfies a predetermined criteria.

4. The method according to claim 2, further comprising the steps of:

setting a first predetermined maximum number indicating a maximum number of recipients on the distribution list that may be processed in a single block;

determining a first number of recipients on the distribution list; and creating a plurality of copies of the short message corresponding in number to the plurality of recipients, wherein if the first number exceeds the first predetermined maximum number, performing the steps of:

grouping the plurality of copies of the short message into a plurality of blocks, each one of the plurality of blocks containing a maximum number of copies corresponding to the first predetermined maximum number, transmitting a first block of the plurality of blocks, monitoring a delivery status of the first block, and transmitting a second block of the plurality of blocks after the delivery status satisfies a predetermined criteria.

5. The method according to claim 1, further comprising the step of defining an access scheme for the first market segment, the access scheme determining whether an administrator is permitted to perform a plurality of administrative functions affecting a message processing characteristic for the at least one service user assigned to the first market segment.

6. The method according to claim 5, wherein the plurality of administrative functions includes defining at least one recipient to whom the at least one service user is permitted to send messages and at least one sender from whom the at least one service user is permitted to receive messages.

7. The method according to claim 6, wherein the defining of the at least one recipient to whom the at least one service user is permitted to send messages and the at least one sender from whom the at least one service user is permitted to receive messages is performed by assigning the at least one service user to a closed user group.

8. The method according to claim 1, wherein the processing of the short message performs one of a plurality of teleservices, the method further comprising the steps of:

setting up a priority table indicative of a prioritization scheme for the plurality of teleservices; and assigning a teleservice type to the short message indicating which one of the plurality of teleservices is being performed by the short message;

wherein the processing of the short message is prioritized in relation to a processing of other short messages as a function of the priority table.

9. The method according to claim 1, further comprising the step of assigning the short message to at least one second market segment, wherein the processing of the short message is further performed as a function of the at least one second market segment.

10. The method according to claim 9, wherein the step of assigning the short message to the at least one second market segment includes the steps of:

initially assigning the short message to a third market segment corresponding to the message originator upon receiving the short message;

determining the first market segment corresponding to the at least one service user receiving the short message; and assigning the short message to the first market segment corresponding to the at least one service user.

11. The method according to claim 1, wherein the processing of the short message is performed by one of a plurality of parallel processes, and wherein the one of the plurality of parallel processes is selected as a function of at least one operating characteristic of the one of the plurality of parallel processes.

12. The method according to claim 11, wherein the at least one operating characteristic includes at least one of a queue size, latency and a growth rate.

13. The method according to claim 1, further comprising the steps of:

determining a first message size of the short message; and determining a second message size corresponding to a maximum capacity of a service entity servicing the at least one service user, wherein if the first message size is larger than the second message size, performing the steps of:

segmenting the short message into a plurality of message segments, transmitting a first message segment of the plurality of message segments, determining a transfer status of the first message segment, re-transmitting the first message segment if the transfer status indicates an unsuccessful transfer, and transmitting a second message segment if the transfer status indicates a successful transfer.

14. The method according to claim 1, further comprising the steps of:

setting a configuration flag indicator to a predetermined value if a change is made to one of a plurality of temporary system parameters, each one of the plurality of temporary system parameters corresponding to a respective one of a plurality of operating system parameters of the short message service center;

checking the configuration flag indicator after receiving the short message; and replacing each one of the plurality of operating system parameters with the corresponding one of the plurality of temporary system parameters if the configuration flag indicator has been set to the predetermined value.

15. The method according to claim 1, wherein the short message includes an identifier variable indicating an address of the at least one service user, the method further comprising the step of:

setting a routing method variable indicating a routing method to be used by the short message service center, wherein if the routing method variable indicates a table routing method is to be used, performing the steps of:

accessing an internal lookup table, the internal lookup table including a point code and a subsystem number of a location register servicing the at least one service user, transmitting the short message and the identifier variable to the location register using the point code and subsystem number, and wherein if the routing method variable indicates a global title translation method is to be used, performing the steps of:

transmitting the short message, the identifier variable, and a predetermined subsystem number to a signal transfer point.

16. A method for processing a short message for delivery to at least one service user comprising the steps of:

receiving a short message having one of a first message format and a second message format;

converting the short message into a canonical message format, the canonical message format including a superset of the first message format and the second message format;

converting the short message into another one of the first message format and the second message format corresponding to a message format recognized by a service entity servicing the at least one service user; and delivering the converted short message to the at least one service user in the another one of the first message format and the second message format.

17. The method according to claim 16, wherein the first message format includes one of an ANSI-41 format and a GSM 03.40 format and the second message format includes the other one of the ANSI-41 format and the GSM 03.40 format.

18. A method for delivering a short message to a distribution list having a plurality of recipients, the method comprising the steps of:

setting a first predetermined maximum number of short messages;

determining a first number of recipients on the distribution list;

creating a plurality of copies of the short message corresponding in number to the plurality of recipients; and delivering each one of the plurality of copies of the short message to a respective one of the plurality of recipients, wherein if the first number exceeds the first predetermined maximum number, performing the steps of:

grouping the plurality of copies of the short message into a plurality of blocks, each one of the plurality of blocks containing a maximum number of copies corresponding to the first predetermined maximum number, transmitting a first block of the plurality of blocks, monitoring a delivery status of the first block, and transmitting a second block of the plurality of blocks after the delivery status satisfies a predetermined criteria.

19. A method of providing a plurality of teleservices, the teleservices being provided by processing a plurality of short messages, the method comprising the steps of:

defining a priority table indicative of a prioritization scheme for the plurality of teleservices; and assigning a teleservice type to each one of the plurality of short messages, the teleservice type indicating which one of the plurality of teleservices is being performed by each one of the plurality of short messages, wherein the processing of each one of the plurality of short messages is prioritized in relation to a processing of another one of the plurality of short messages as a function of the priority table.

20. A method of delivering a short message to at least one service user being serviced by a service entity, the method comprising the steps of:

determining a first message size of the short message;

determining a second message size corresponding to a maximum capacity of the service entity servicing the at least one service user; and delivering the short message to the at least one service user, wherein if the first message size is larger than the second message size, performing the steps of:

segmenting the short message into a plurality of message segments, transmitting a first message segment of the plurality of message segments, determining a transfer status of the first message segment, re-transmitting the first message segment if the transfer status indicates an unsuccessful transfer, and transmitting a second message segment if the transfer status indicates a successful transfer.

21. A method of delivering a short message to at least one service user, the short message including an identifier variable indicating an address of the at least one service user, the method comprising the steps of:

setting a routing method variable indicating a routing method to be used by the short message service center; and delivering the short message to the at least one service user, wherein the step of delivering the short message includes the following sub-steps if the routing method variable indicates a table routing method is to be used:

accessing an internal lookup table, the internal lookup table including a point code and a subsystem number of a location register servicing the at least one service user, transmitting the short message and the identifier variable to the location register using the point code and subsystem number, and wherein if the routing method variable indicates a global title translation method is to be used the step of delivering the short message, performing the step of:

transmitting the short message, the identifier variable, and a predetermined subsystem number to a signal transfer point.

22. A system for processing at least one short message comprising:

a plurality of databases;

a processor accessing the plurality of databases; and a plurality of interfaces connecting the processor to at least one of an administrator, a local area network, a wide area network and a wireless telecommunications network, at least one of the plurality of interfaces receiving the at least one short message, wherein the plurality of databases includes a plurality of system configuration databases, the plurality of system configuration databases including:

a first database storing a plurality of subscriber attributes for at least one service user, the plurality of subscriber attributes including a first market segment identifier associating the at least one service user with a first market segment, a second database storing a plurality of operating parameters for the first market segment, the plurality of operating parameters indicative of a plurality of storage characteristics and a plurality of delivery characteristics for the at least one market segment, wherein the plurality of databases further includes a short message database storing the at least one short message and a corresponding plurality of message characteristics, and wherein the processor stores and delivers the at least one short message as a function of the plurality of operating parameters for the first market segment associated with the at least one service user.

23. The system according to claim 22, wherein the plurality of interfaces includes at least one of an administrative interface, a multi-protocol interface and an SS7 IPC interface.

24. The system according to claim 22, wherein the multi-protocol interface includes support for a Short Messaging Point-to-Point Protocol, Telocator Alphanumeric Protocol, Simple Mail Transfer Protocol, and a Telocator Data Protocol.

25. The system according to 22, wherein the plurality of interfaces includes at least one of an Ethernet interface, a V.35 interface and an RS-232 interface.

26. The system according to 22, wherein the plurality of operating parameters for the first market segment further includes at least one parameter indicative of an access scheme for access to a plurality of administrative functions affecting a message processing characteristic for the at least one service user associated with the first market segment.

27. The system according to 22, wherein the processing of the at least one short message performs one of a plurality of teleservices, wherein the plurality of system configuration databases includes a third database storing a prioritization scheme for the plurality of teleservices, wherein the plurality of message characteristics for the at least one short message includes a teleservice type field indicating which one of the plurality of teleservices is being performed by the processing of the at least one short message, and wherein the processing of the least one short message is further performed as a function of the teleservice type field.

28. The system according to claim 22, wherein the corresponding plurality of message characteristics for the at least one short message includes a second market segment identifier associating the at least one short message to a short message market segment.

29. The system according to claim 22, wherein the processor processes the at least one short message using a plurality of parallel processes, and wherein the plurality of system configuration databases further includes at least one process characteristics database storing at least one operating characteristic for each one of the plurality of parallel processes.

30. The system according to claim 22, wherein the plurality of system configuration databases further includes a service entity attributes table indicative of at least a message size corresponding to a maximum capacity of a first service entity servicing the at least one service user.

31. The system according to claim 22, wherein the plurality of system configuration databases further includes a fourth database storing a plurality of temporary system configuration parameters and a fifth database storing a plurality of operating system configuration parameters and a configuration flag indicator that is set to a predetermined value if a change is made to one of the plurality of temporary system configuration parameters via one of the plurality of interfaces.

32. The system according to claim 22, wherein the plurality of system configuration databases includes a routing method variable indicating a routing method to be used by the system and a sixth database storing at least one point code and at least one subsystem number corresponding to an address of a service entity servicing the at least one service user and a seventh database storing at least one predetermined subsystem number corresponding to a first service entity servicing the at least one service user.

33. A system for processing at least one short message received in one of a first format and a second format, the system comprising:

a plurality of databases;

a processor accessing the plurality of databases; and a plurality of interfaces connecting the processor to at least one of an administrator, a local area network, a wide area network and a wireless telecommunications network, wherein the plurality of databases includes a first short message database storing the at least one short message in the one of the first format and the second format, wherein the plurality of databases includes a second short message database storing the at least one short message in a canonical format, the canonical format including a superset of the first format and the second format, and wherein the plurality of databases includes a third short message database storing the at least one short message in another one of the first format and the second format.

34. A system for processing at least one short message comprising:

a plurality of databases including a first database storing a prioritization scheme for a plurality of teleservices and a short message database storing the at least one short message and a corresponding plurality of message characteristics;

a processor accessing the plurality of databases and processing the at least one short message; and a plurality of interfaces connecting the processor to at least one of an administrator, a local area network, a wide area network and a wireless telecommunications network, at least one of the plurality of interfaces receiving the at least one short message, wherein the processing of the at least one short message performs one of the plurality of teleservices, wherein the plurality of message characteristics for the at least one short message includes a teleservice type field indicating which one of the plurality of teleservices is being performed by the processing of the at least one short message, and wherein the processing of the least one short message is further performed as a function of the teleservice type field.

35. A system for processing at least one short message comprising:

a plurality of databases;

a processor accessing the plurality of databases and processing the at least one short message; and a plurality of interfaces connecting the processor to at least one of an administrator, a local area network, a wide area network and a wireless telecommunications network, at least one of the plurality of interfaces receiving the at least one short message, wherein the processor processes the at least one short message using a plurality of parallel processes, and wherein the plurality of databases includes at least one process characteristics database storing at least one operating characteristic for each one of the plurality of parallel processes.

36. A system for processing at least one short message comprising:

a plurality of databases;

a processor accessing the plurality of databases and processing the at least one short message; and a plurality of interfaces connecting the processor to at least one of an administrator, a local area network, a wide area network and a wireless telecommunications network, at least one of the plurality of interfaces receiving the at least one short message, wherein the plurality of databases includes a service entity attributes table indicative of at least a message size corresponding to a maximum capacity of a first service entity servicing the at least one service user.

* * * * *